(12) United States Patent  
Zeuner et al.

(10) Patent No.: US 7,784,743 B2
(45) Date of Patent: Aug. 31, 2010

(54) LINE HOLDER IN AN AIRCRAFT

(75) Inventors: Lutz Zeuner, Hardebek (DE); Lueder Kosiankowski, Jork (DE); Hans-Peter Guthke, Buxtehude (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 12/067,971

(22) PCT Filed: Sep. 28, 2006

(86) PCT No.: PCT/EP2006/009438
§ 371 (c)(1),
(2), (4) Date: Aug. 12, 2008

(87) PCT Pub. No.: WO2007/039228
PCT Pub. Date: Apr. 12, 2007

(65) Prior Publication Data
US 2009/0026327 A1    Jan. 29, 2009

(30) Foreign Application Priority Data
Sep. 29, 2005    (DE) .................. 10 2005 046 766

(51) Int. Cl.
F16L 17/02    (2006.01)
(52) U.S. Cl. ........................................ 248/63
(58) Field of Classification Search ............ 248/71, 248/73, 74.1, 74.3
See application file for complete search history.

(56) References Cited

U.S. PATENT DOCUMENTS 3,632,069 A * 1/1972 Thayer et al. ............. 248/56
4,185,800 A   1/1980 Kabel
4,896,851 A   1/1990 Shaull
5,587,555 A   12/1996 Rinderer
6,641,093 B2 * 11/2003 Coudrais ................. 248/73
6,994,300 B2  2/2006 Labeirie
7,207,758 B2 * 4/2007 Leon et al. ............... 411/45

(Continued)

FOREIGN PATENT DOCUMENTS

DE    1776447 U    10/1958

(Continued)

Primary Examiner—J. Allen Shriver, II
Assistant Examiner—Erin Smith
(74) Attorney, Agent, or Firm—Ingrassia Fisher & Lorenz, P.C.

(57) ABSTRACT

The present invention relates to a retainer or holder for positioning a line on a structural component, a line guiding system for reducing sag in line guiding, and an aircraft having at least one line, which is equipped with a line guiding system according to the present invention. In addition, the present invention relates to the use of the line guiding system according to the present invention in an aircraft. The holder essentially comprises a main body, a bracing element and an engagement element. The bracing element projects from the bottom side of the main body and divides the main body globally into a cantilever section and a support section. The engagement element is adapted to be received frictionally locked by a reception opening in a structural component. A support for a line is located on the top side of the main body in the area of the cantilever section, through whose weight load the holder experiences a torque, which is transferred via the bracing element and the engagement element as a force couple into the structural component.

15 Claims, 7 Drawing Sheets

U.S. PATENT DOCUMENTS

2004/0232287 A1* 11/2004 Rosemann et al. ......... 248/68.1
2005/0204519 A1* 9/2005 Zeuner et al. ............... 24/457

FOREIGN PATENT DOCUMENTS

| | | |
|---|---|---|
| DE | 2624968 A1 | 12/1977 |
| DE | 9103088 U1 | 6/1991 |
| DE | 29821638 U1 | 2/1999 |
| DE | 10016225 A1 | 10/2001 |
| DE | 20318368 U1 | 2/2004 |
| EP | 1180838 A1 | 2/2002 |
| EP | 1367308 A1 | 12/2003 |
| GB | 624188 | 5/1949 |
| JP | 10174257 | 6/1998 |
| JP | 11280951 | 10/1999 |

* cited by examiner

LINE HOLDER IN AN AIRCRAFT

CROSS-REFERENCE TO RELATED APPLICATIONS

This application is a U.S. National-Stage entry under 35 U.S.C. §371 based on International Application No. PCT/EP2006/009438, filed Sep. 28, 2006, which was published under PCT Article 21(2) and which claims priority to German Patent Application No. 10 2005 046 766.0 filed Sep. 29, 2005 and to U.S. Provisional Patent Application No. 60/721,703 filed Sep. 29, 2005, the disclosures of which applications are hereby incorporated herein by reference.

FIELD OF THE INVENTION

The present invention relates in general to the technical area of equipment mounting in the field of aerospace technology. In particular, the present invention relates to a holder for positioning a line on a structural component. Furthermore, the present invention relates to a line guiding system to reduce sag in line guiding. In addition, the present invention relates to an aircraft having at least one line, which is equipped with a line guiding system according to the present invention, as well as a use of the line guiding system according to the present invention in an aircraft.

BACKGROUND OF THE INVENTION

In modern aircraft, a large number of different electrical cables and pipes are typically laid for controlling and supplying greatly varying units and consumers. When a line is mentioned in the scope of the present patent application, this concept is to be understood broadly, so that in particular electrical cables, pipes and hoses carrying fluid, bundles of the cited lines, as well as any other supply lines of an aircraft are to be subsumed thereunder.

In order to be able to lay lines of this type in an orderly way in an aircraft, typical fasteners in the form of cable holders or cable holders are employed, using which the lines are attached at specific intervals to suitable attachment surfaces of the aircraft. The holders are adapted to the concrete connection conditions of the attachment surfaces, because of which multiple different holders must be kept ready. These attachment surfaces are, for example, transverse girders, frames, stringers, ribs, and any other constructive components of an aircraft, which are referred to as a whole as structural components in the scope of the present invention.

Because of the partially greatly varying design of the individual structural components, multiple greatly varying cable holders must be kept ready. The required number of different cable holders to be kept in reserve additionally increases because cable holders of different sizes must be kept in reserve for lines of different diameters or thicknesses, in order to be able to securely fix lines of arbitrary diameters. Thus, for example, known cable holders are simple cable clips, which are only capable of accommodating lines in a specific diameter range, because of which multiple different cable clips must be kept in reserve.

Furthermore, these cable clips have been shown to be problematic because orderly line guiding which is free of sag is not possible or is only imperfectly possible using them. Thus, lines are frequently guided from transverse girder to transverse girder in an aircraft, which results in significant and undesired sags because of the weight of the individual lines, which is frequently significant.

Since the known cable clips typically comprise aluminum, these known cable clips additionally have an undesired high intrinsic weight. Since lines are frequently attached to conductive structural components, in addition, because of the metallic implementation of the known cable clips, special insulating guidelines must be followed, so that frequently a complex ground connection must be provided on the conductive structural components, which again undesirably results in additional excess weight.

SUMMARY OF THE INVENTION

Proceeding from the problems affecting the known cable retainers or cable holders described above, it is an object of the present invention to specify an implementation for line retention and guiding which at least partially corrects the problems described above.

Accordingly, according to a first aspect of the present invention, a retainer or holder for positioning a line on a structural component is specified, which comprises a main body, a bracing element, and an engagement element. The main body has a top side and a bottom side, because of which the relationship of the holder to the structural component and the lines may be understood better, since the line is always guided along the top side of the holder and the structural component extends essentially below the holder.

The bracing element is connected in one piece to the main body and projects from the bottom side of the main body, so that in the mounted state of the holder, it rests on a lateral face of the structural component. Through the position of the bracing element in relation to the main body, it is divided into two different areas having different functions: thus, the position of the bracing element divides the main body into a cantilever section and, in addition, a support section. As the terminology used already indicates, the cantilever section protrudes over the structural component in the mounted state and thus projects from it. In contrast thereto, the support section presses against the structural component in the mounted state of the holder on the structural component. The support section and the cantilever section pass into one another, the boundary between these two sections being defined by the bracing element. A longitudinal direction of the main body or the holder is defined by the orientation of a line carried by the holder, which extends over the cantilever section and the support section on the top side of the main body.

The engagement element of the holder projects from the main body on the bottom side of the main body in the area of the support section and is connected thereto in one piece. The engagement element is adapted to be inserted into a reception opening, which is formed in the structural component, and to be received therein frictionally locked. At least one support, on which the line may be laid from above, is formed on the top side of the main body in the area of the cantilever section for positioning a line. Due to the weight load by the line, by which the cantilever section is loaded, the entire holder experiences a torque which is transferred via the bracing element and the engagement element as a force couple into the structural component. The engagement element is thus impinged in the static case with a tensile force which may be transferred into the structural component via the friction lock which the engagement element forms with the reception opening in the structural component. In contrast thereto, the bracing element is impinged in the static case with a compression force, which may be transferred directly via compressive stresses into the structural component.

In order that the support section contacts the structural component securely, the support section may have a flat face on the bottom side of the main body or may also be formed overall as a planar component, from which the engagement element projects on the bottom side. On the top side, the support section may have a rising stiffening bevel in the transition area to the cantilever section, on which a line is guided in the direction of the cantilever section projecting in front of the structural component, through which the line sag may be additionally reduced. In order that the bracing element does not yield elastically under static and particularly under dynamic loads, it may be reinforced by a stiffening rib which runs perpendicularly to the bracing element on the bottom side of the cantilever section.

In order to produce the friction lock noted above between the engagement element and the reception opening in the structural component, the engagement element may have a shape expanding in a wedge from the support section, in which case the holder additionally comprises a separate counter wedge, using which the engagement element may be wedged frictionally locked in the reception opening of the structural component. The wedge shape of the engagement element expands with increasing distance from the support section, because of which, as a result of the tensile force acting on the engagement element, the frictional engagement between engagement element and the reception opening, in which the engagement element is fitted, and/or between the wedge shape, the counter wedge, and the walls of the reception opening, is increased, which results in reinforcement of the friction lock. Due to the shaping of the engagement element in connection with the counter wedge, the friction lock thus may not shake loose as a result of dynamic load, since the friction lock between engagement element and reception opening is continuously maintained by a tensile stress which acts on the engagement element in the event of static load. The shape of the engagement element expanding in a wedge may form a truncated cone, for example, which is cut away diagonally over its height, through which a diagonal face, which may be wedged, is formed, which may be wedged frictionally locked with a correspondingly implemented counter wedge into the reception opening. Alternatively thereto, the engagement element may, of course, also have any other shape, such as that of a cuboid which has been cut away diagonally over its height, to form a face which may be wedged.

In order to be able to wedge the separate counter wedge easily and effectively with the wedge shape of the engagement element, the support section may have a through opening, through which the counter wedge may be wedged against the wedge shape of the engagement element and, in addition, against the reception opening of the structural component. The through holes in the support section and the engagement element are situated in relation to one another in such a way that the wedge may be stuck through the through opening and simultaneously frictionally engage its wedge face with that of the engagement element. For this purpose, the wedge face of the engagement element forms a border of the through opening in the support section, so that the wedge shape of the engagement element more or less binds in the through opening.

As already noted from the description above, using the holder according to the present invention, the line sag of a line guided freely between two transverse girders, for example, may thus be prevented, since the space between the transverse girders over which the line is to be guided freely suspended may be reduced by the cantilever sections of the holder. The longer the cantilever sections are implemented, the shorter the freely suspended interval of the line and thus the sag thereof.

In order to be able to reduce the line sag even further, however, the holder according to the present invention may have a reception unit, which is adapted to be able to secure or fix a line guiding rod therein or thereon. A line guiding rod of this type is understood in the scope of the present invention as a component which bridges the space over which a line is freely suspended. The line guiding rod is used for the purpose of attaching the normally freely suspended line thereon using cable ties or receiving it in another way, for which purpose the line guiding rod may have a U-profile or the like, for example, which is capable of receiving the line. For example, it would also be possible to form the line guiding rod as a tube in which a line may be guided in order to bridge the interval which the line normally bridges freely sagging. In any case, however, the line guiding rod has rigidity properties such that a space may be bridged by it essentially free of sag.

Since the line to be received by the holder according to the present invention is guided over the support section and the cantilever section in the longitudinal direction, the reception unit is located below the at least one line support on the freely projecting end of the cantilever section, so that the line may be received by a line guiding rod attached in or on the reception unit in continuation of the cantilever section. In this case, the reception unit may be formed as a reception pocket for receiving an end of the line guiding rod, in order to secure it therein using a formfitting mechanism. Because the reception pocket is situated below the at least one line support, the line may be guided further directly from the line support to the line guiding rod without offset.

The formfitting mechanism cited may be produced using a locking pin, for example, which may be inserted through a hole produced in a boundary wall of the reception pocket into the reception pocket to secure the line rod therein. In particular, it may be suitable to provide the hole in a boundary wall of the reception pocket which is directed downward, through which the locking pin may be inserted easily from below into the reception pocket.

In order to be able to permanently ensure the lock using the formfitting mechanism employing the locking pin, the locking pin may be equipped on its forward end, which comes to rest in the reception pocket, with an eye, i.e., a through opening, through which a cable tie may be guided. This cable tie may be used for fixing a line laid on the line support in that it encloses the line and, in addition, is threaded through the eye and is subsequently tied down. Moreover, the cable tie is thus used to secure the locking pin in the reception pocket, since it is tied to the line. In order that guiding of the cable tie of this type is possible, the locking pin extends through the line guiding rod, for which purpose this may have a corresponding eye opening.

In order not to have to keep a special holder in reserve for every individual line diameter, in contrast to the cable holders or holders described above, the line supports may have a groove-like or trough-like design. In particular, two groove-shaped supports which are aligned with one another may be formed on the top side of the main body in the area of the cantilever section, which are spaced from one another by a space in such a way that the cable tie may be guided through them to fix a line laid on the two holders. Of course, it would also be possible to provide only one groove-shaped support on the top side of the main body in the area of the cantilever section and thus above the reception pocket, for example, in which corresponding openings for guiding through the cable tie are provided in the area of the reception pocket.

Since the holders according to the present invention, including the associated line guiding rod, are typically mounted at a time at which no lines have yet been laid, and thus also no cable ties have yet been provided to secure the locking pin, the locking pin may adjoin a locking clip or the like at the other end, which is opposite the eye, which may be attached in a formfitting way to the cantilever section by being clipped on, for example. The line guiding rod may thus be inserted into the reception pocket and fixed using the locking pin already during the mounting of the holders, without these locking pins falling out again as long as there is still no cable tie provided through the eye of the locking pin to permanently fix it in the reception pocket.

In order to not absolutely have to follow the above-mentioned insulation guidelines, for example, in the form of ground connections on conductive structural components, the retainers or holders according to the present invention may be manufactured from a plastic material, for example. If both the main body and also the line guiding rods are manufactured from a plastic material, not only are the cited insulation guidelines followed, but rather, in contrast to a metallic implementation of the holder, a weight reduction may also be achieved in this way, which is always desirable in the field of aerospace technology.

According to a further aspect of the present invention, a line guiding system is provided for reducing the sag of a line guided between two structural components, which, in addition to the holder according to the present invention described above, comprises a line guiding rod, one end of which is received by the reception pocket of the holder, so that a line laid on the support of the holder may be laid without sag along the line guiding rod.

The line guiding rod may have any arbitrary profiled shape which allows a line to be laid along it. For example, the line guiding rod may have a tubular shape, in which case a line may be fixed thereon using cable ties. Alternatively thereto, in case of a tubular profile, a line may also be guided in the interior of the tube, for which corresponding entry and exit openings for the line must be provided, of course. According to a further alternative, the line guiding rod may also have a groove-shaped or trough-shaped profile, in which the line may be laid along the line guiding rod.

In order that the line guiding rod may be locked without problems in the reception pocket using the locking pin of the holder, the line guiding rod is equipped at its ends with a ear which is penetrated by an eye. In this way, it may be ensured that the locking pin does not have to penetrate the entire thickness of a line guiding rod and therefore has to be implemented correspondingly long. Rather, through a planar ear implementation, the locking pin may be kept relatively short and the overall height of the reception pocket and thus the holder itself may be reduced.

According to yet a further aspect of the present invention, an aircraft having at least one line is specified, which is guided between two structural components of the aircraft without sag using a line guiding system as was described above. It is not necessary for a holder according to the present invention to be provided on both structural components; rather, of course, it is also possible for a holder according to the present invention to be located on only one of the structural components, from which the line guiding rod leads to the other structural component, to which the line guiding rod may be attached in another way.

Finally, according to yet a further aspect of the present invention, the use of a line guiding system having the features described above is suggested to guided a line at least partially in an aircraft without sag between two structural components.

BRIEF DESCRIPTION OF THE DRAWINGS

In the following, the present invention is explained for exemplary purposes with reference to the attached drawing. The exemplary embodiment described as an example in the figures is solely used for better understanding of the present invention and, in particular, is not to be understood as restricting the protective scope.

In all of the figures, identical or similar elements are identified by identical or corresponding reference numerals. The illustrations are not necessarily to scale, but indicate qualitative dimensional ratios.

DETAILED DESCRIPTION

Figure 1:
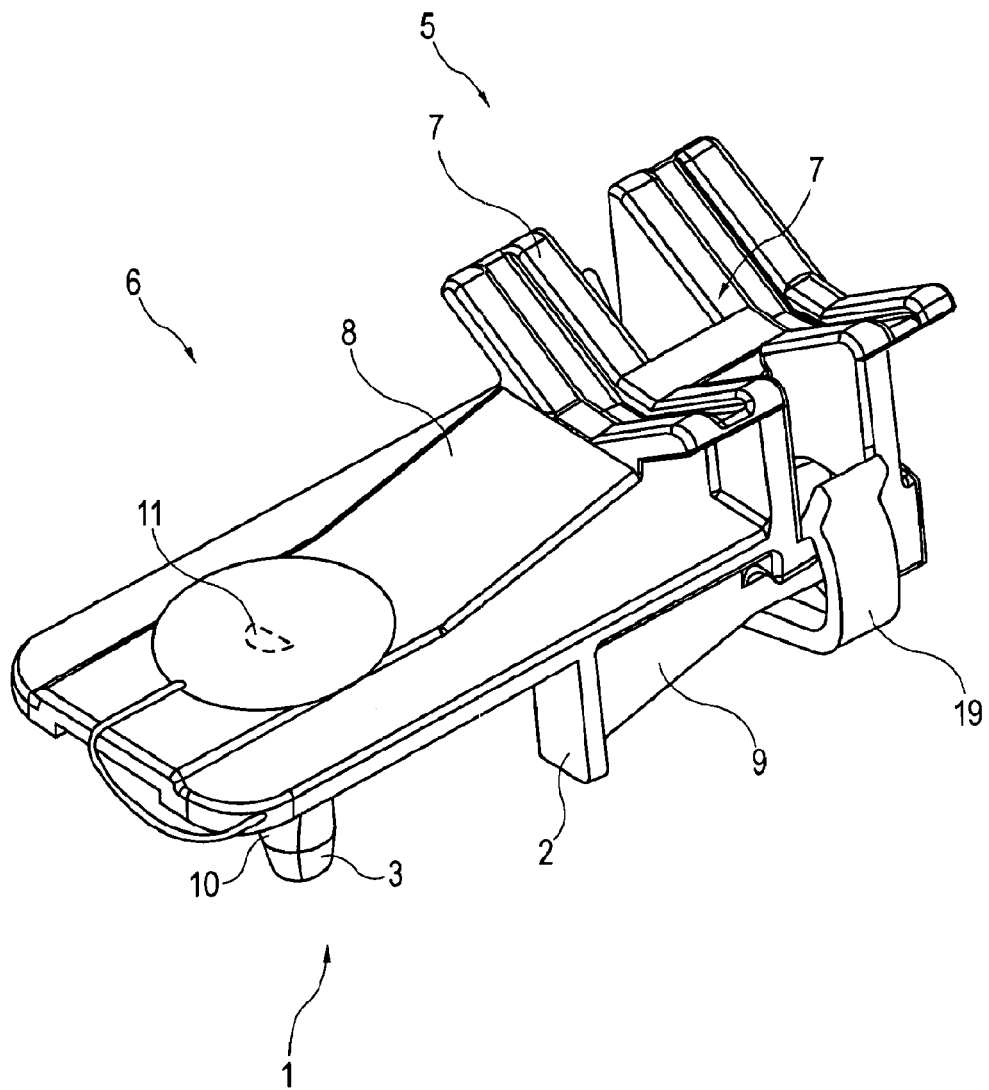
FIG. 1 shows a perspective view of the holder according to the present invention.
Figure 2:
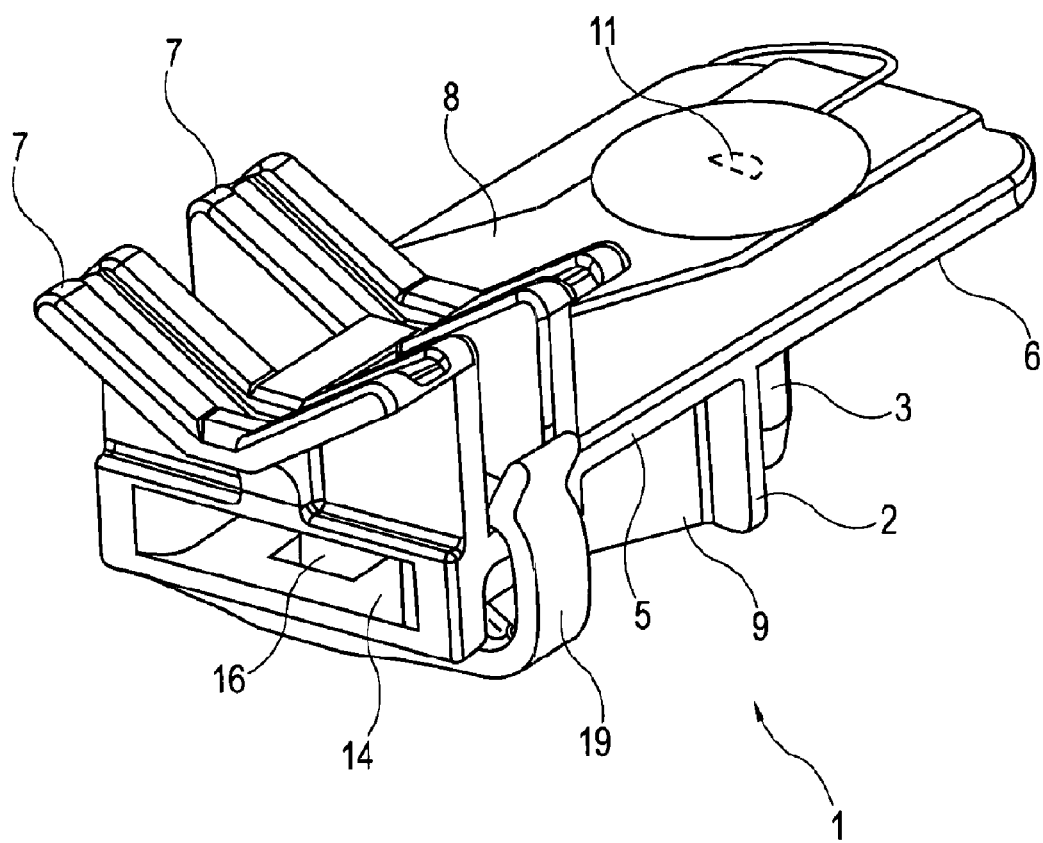
FIG. 2 shows a further perspective view of the holder according to the present invention.

In the following, the present invention is described in greater detail with reference to FIGS. 1 through 8, reference predominantly being made to one figure in each of the passages of the description, but the remaining figures to be considered in parallel for better understanding.

Firstly, the support and engagement elements 2, 3 used for mounting the holder 1 according to the present invention and their interaction in the overall system are explained with reference to FIGS. 1 and 4. As may be inferred from these figures, the holder according to the present invention is essentially formed by an oblong main body, which, viewed globally, is formed in one piece of a cantilever section 5 and a support section 6. Two web-shaped bracing elements 2 project from the bottom side of the main body, which press against a structural component 4 (see FIG. 5) in the mounted state of the holder 1. The cantilever section 5 and the support section 6 are defined by the position of the bracing elements 2 in relation to the longitudinal direction of the main body, since, as may be inferred from FIG. 5, the holder 1 rests completely on the flange of the structural component 4 in the area of the support section 6 up to the bracing element 2. Beyond the bracing elements 2, in contrast, the cantilever section 5 protrudes beyond the structural component 4 in the mounted state and thus projects therefrom.

Since the holder 1 is impinged by a cantilever torque as a result of this protrusion, the holder 1 must be secured appropriately on the structural component 4. For this purpose, an engagement element 3 (FIG. 4) extends downward from the bottom side of the main body in the area of the support section 6, using which the holder 1 may be secured frictionally locked in a corresponding reception opening in the structural component 4. In order to produce this frictional lock, the engagement element 3 may have a shape expanding in a wedge from the support section 6, as may be inferred best from the cross-sectional illustration of FIG. 6 and FIG. 4. In addition, the holder 1 comprises a separate counter wedge 10, using which the engagement element 3 may be wedged frictionally locked in the reception opening of the flange of the structural component 4. As may also be inferred from FIG. 6, the engagement element 3 has a wedge shape which expands with increasing distance from the support section 6, because of which, as a result of the tensile force acting on the engagement element 3, the frictional engagement between the engagement element 3 and the reception opening in the structural component, and/or between the wedge shape of the engagement element 3, the counter wedge 10, and the walls of the reception opening is thus increased, which results in a reinforcement of the frictional lock. As may be recognized in FIGS. 1, 4, and 6, the shape of the engagement element expanding in a wedge may be formed as a truncated cone, for example, which is cut away diagonally over its height, through which a diagonally standing face which may be wedged is formed, which may be wedged frictionally locked in the reception opening with the correspondingly formed counter wedge 10. The counter wedge 10 may be formed on its truncated end with a broad, flattened head, using which it may be wedged manually against the wedge-shaped engagement element 3.

Figure 3:
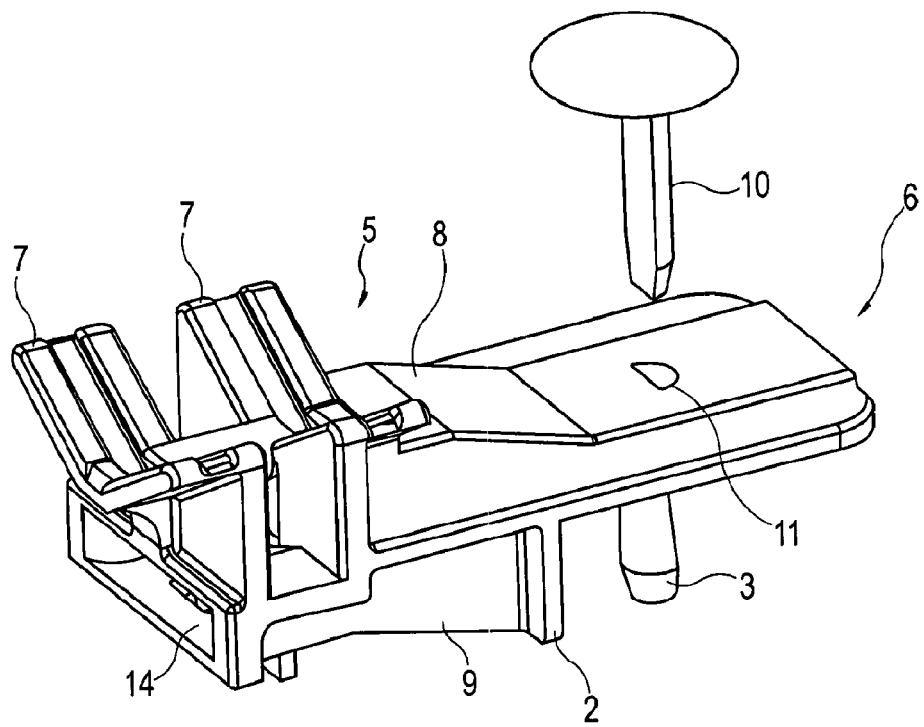
FIG. 3 shows a perspective view of the holder according to the present invention having the counter wedge pulled out.
Figure 4:
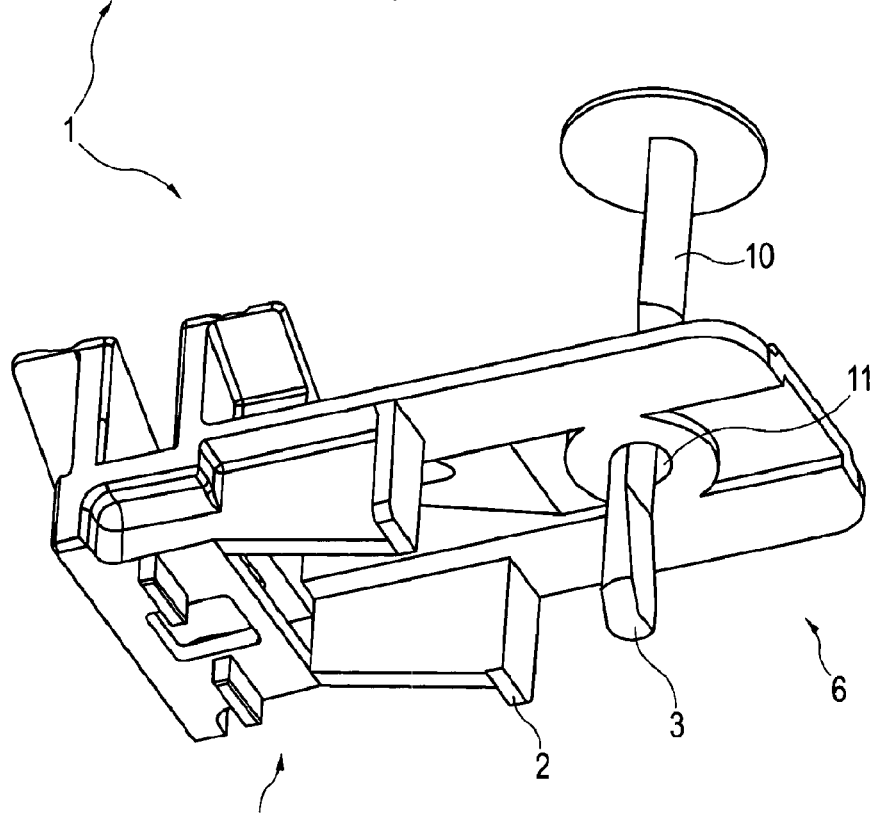
FIG. 4 shows a perspective bottom view of the holder according to the present invention having the counter wedge pulled out.
Figure 6:
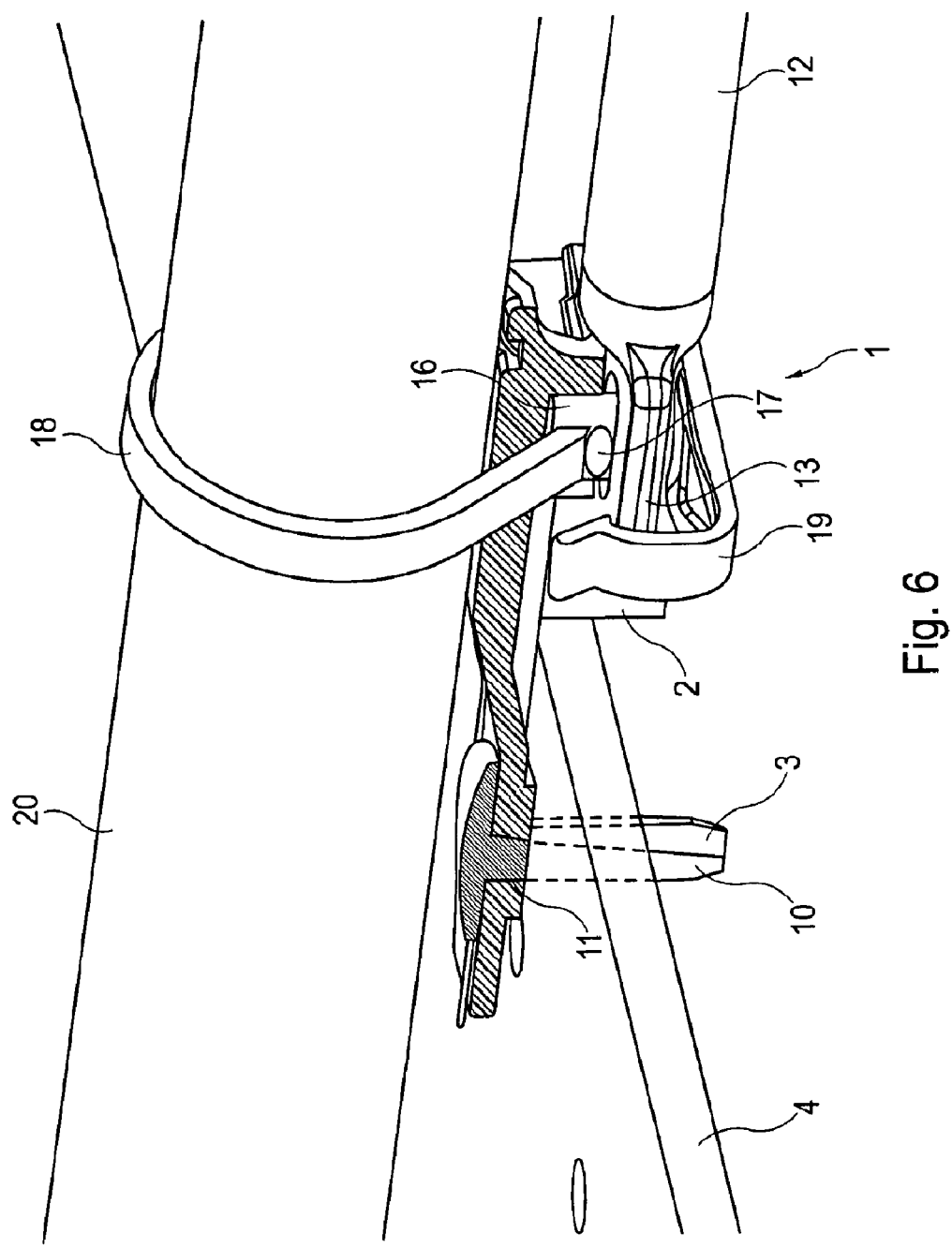
FIG. 6 shows a further perspective, partially sectional illustration of the line system according to the present invention.

In order to be able to wedge the separate counter wedge 10 easily and effectively with the wedge shape of the engagement element 2, a through opening 11 is implemented in the support section 6, as may be inferred best from FIG. 3 or FIG. 4, through which the counter wedge may be stuck. In this way, the wedge face of the counter wedge 10 comes into contact with the wedge face of the engagement element 2, through which the engagement element 2 and the counter wedge 10 may be wedged in the through opening 11. As FIGS. 6 and 4 show, the wall side of the through opening 11 facing toward the engagement element 2 passes directly into the wedge face of the engagement element 2, so that the wedge shape of the engagement element 2 binds more or less directly in the through opening 11. In this way, it is possible to stick the counter wedge 10 through the through opening 11 (see FIG. 3) and simultaneously frictionally engage it with the wedge shape of the engagement element 3, in order to achieve the desired frictional lock effect.

As may also be inferred from FIGS. 1 and 6, the head of the counter wedge 10 is connected with the aid of a plastic thread to the support section 6. This represents a simplification for logistical reasons in particular, since in this way a counter wedge 10 is assigned inseparable to every holder 1.

Figure 5:
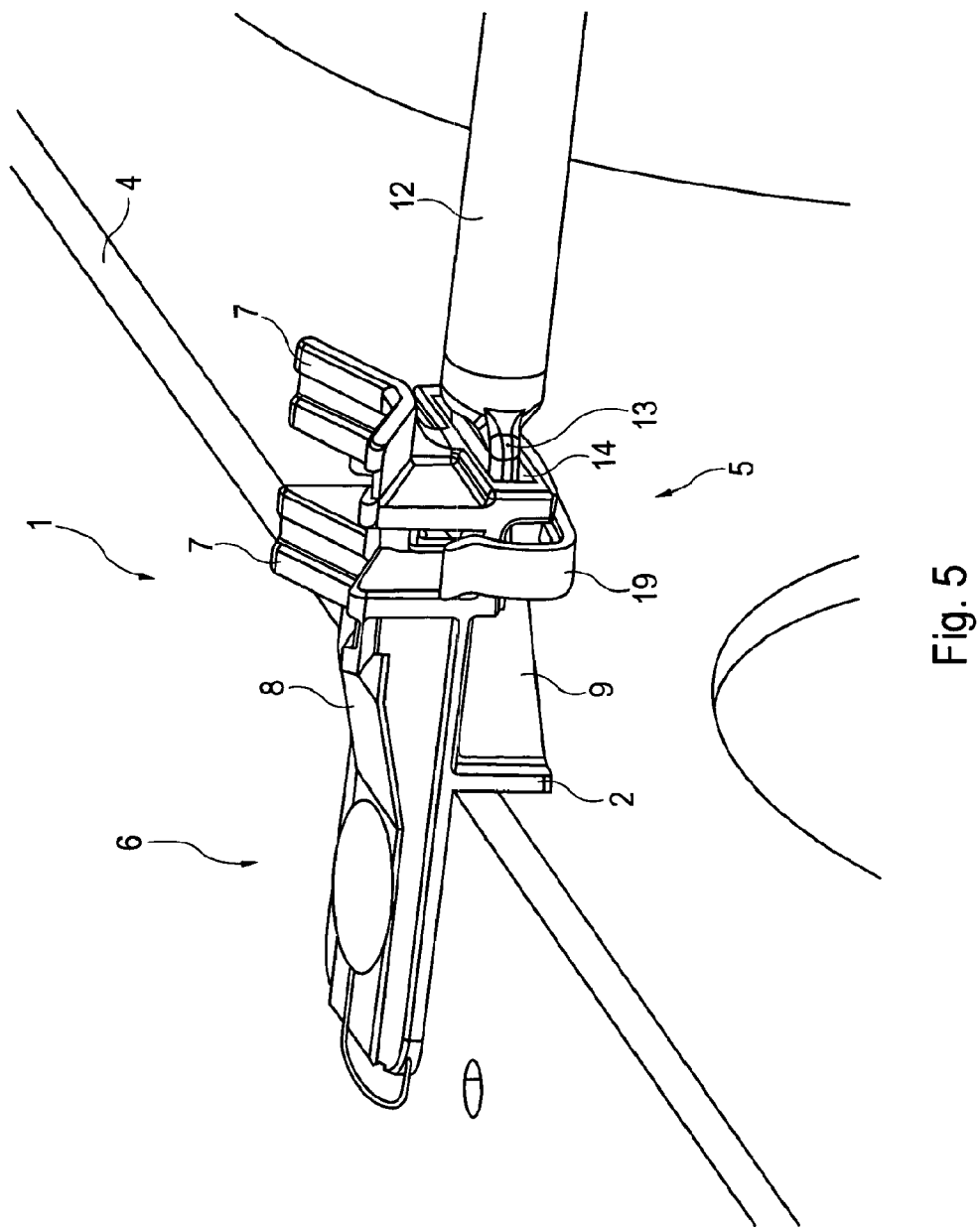
FIG. 5 shows a perspective view of the line guiding system according to the present invention.

As may be inferred best from FIGS. 5 and 6, because of its previously described constructive implementation, the holder 1 may be attached to a structural component 4 as is shown in FIGS. 5 and 6 on a transverse girder having a T-profile, so that the entire face of its support section 6 rests on the flange of the transverse girder 4 and, in addition, its cantilever section 5 projects beyond the transverse girder 4. In this way, the line sag of a line 20 guided freely between two transverse girders 4 may be prevented by the holder 1 according to the present invention, since the interval between the transverse girders 4 over which the line 20 is to be guided freely suspended is reduced by the cantilever sections 5 of the holder 1. The longer the cantilever sections 20, the shorter the freely suspended interval of the line 20 and thus the sag thereof.

In order to be able to attach a line 20 securely and sorted to or on the holder 1 according to the present invention, a support 7 for a line 20 is formed on the top side of the main body of the holder 1 in the area of the cantilever section 5, through whose weight load the holder 1 experiences an additional cantilever torque, which is also transferred via the bracing element 2 and the engagement element 3 in the form of compression and tension into the structural component 4. As may be inferred from the figures, the line guiding supports 7 have a design shaped like a groove, trough, or V, so that lines 20 of different thicknesses may be received therein. In the present embodiment, two V-shaped supports are formed on the top side of the main body in the area of the cantilever section 5, which are situated at a distance from one another, so that a cable tie 18 for fixing the line 20 laid on the holders or supports 7 may be guided through the space between the two supports 7, as may be inferred from FIG. 6.

In order to reduce the line sag between two transverse girders 4 further, and to provide the cantilever section with a greater static height, a rising stiffening bevel 8 is formed on the top side of the support section in the transition to the cantilever section 5, due to which the line 20 comes to rest higher overall, through which the sag in relation to the transverse girders 4 may be reduced.

In order to reduce the line sag even further, a line guiding rod 12 is to be connected to the holder 1, which bridges the space over which the line 20 is to be guided freely suspended. The line guiding rod 12 is used for the purpose of attaching the normally freely suspended line 20 using cable tie 18, for example, so that the line may be laid essentially without sag between two transverse girders 4. The line guiding rod 12 is secured in a reception pocket 14 at the freely projecting end of the cantilever section 5, so that the line 20 may be laid further along the line guiding rod 12 in continuation of the cantilever section 5. In order to be able to secure the line guiding rod 12 reliably in the reception pocket 14, the reception pocket 14 has a hole 16 in its lower boundary wall (FIGS. 2 and 4), through which a locking pin 15 may be inserted to secure the line rod 12 therein.

Figure 8:
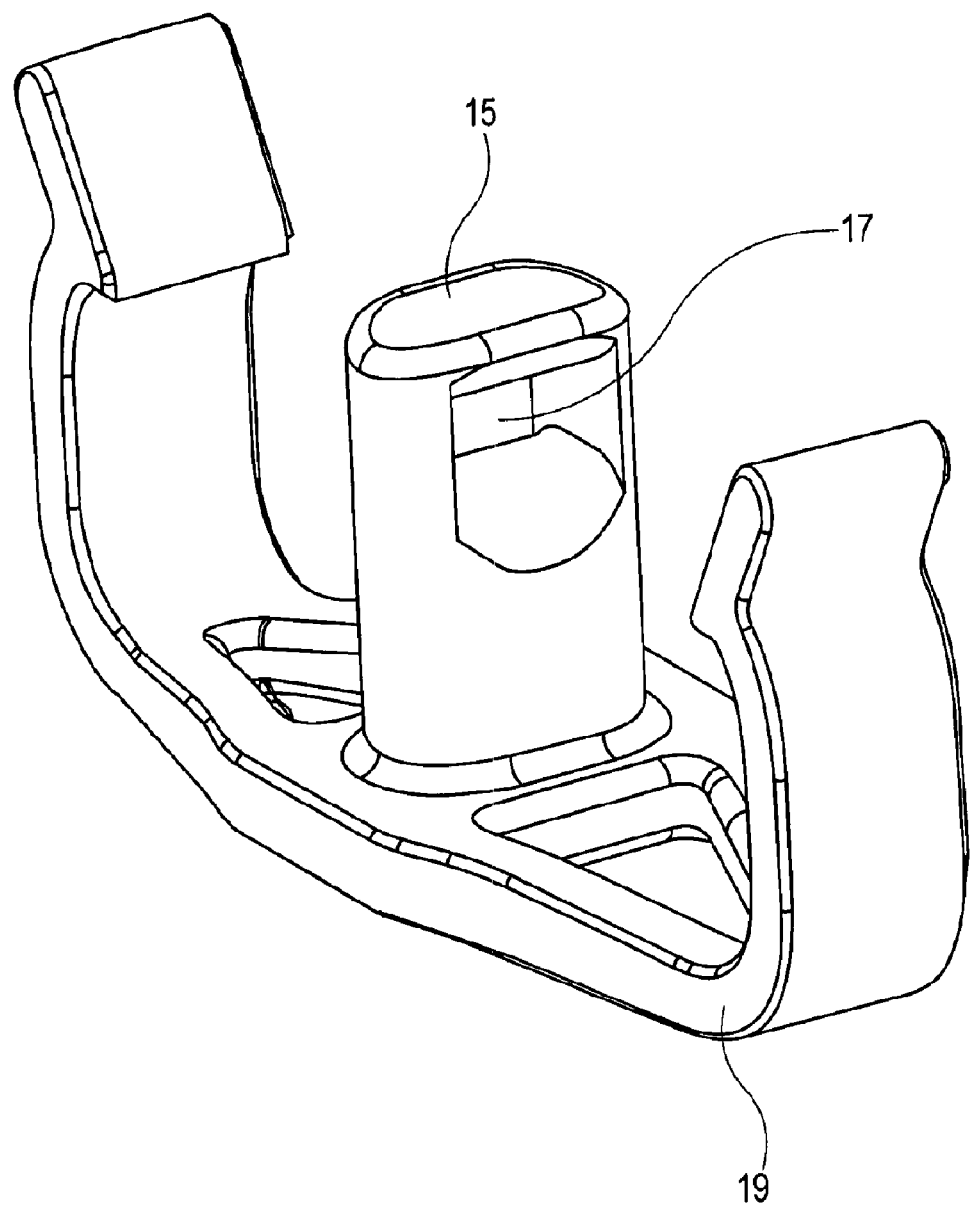
FIG. 8 shows a perspective view of the clips of the holder.

The locking pin 15 has an eye 17 on its front end, i.e., a through hole, through which the previously noted cable tie 18 may be guided, as shown in FIGS. 6 and 8, so that the locking pin 15 does not fall out again after it has been inserted in this way. The cable tie 18 is thus used to fix a line 20 laid on the line supports 7 and, in addition, to secure the locking pin 15 in the reception pocket 14 against falling out in an undesired way. The locking pin 15 extends through the line guiding rod 12, for which this has a corresponding opening, so that guiding of the cable tie 18 in this way is possible. The locking pin 15 is thus secured in the reception pocket 14 and tied down therein using the cable tie 18, which is primarily used for fixing the line 20.

In order to be able to design the reception pocket 14 and thus the entire holder 1 as flat as possible, the line guiding rod 12 is equipped on its end with a ear 13, which is penetrated by the eye previously noted, through which the locking pin 15 is stuck.

Since the holder according to the present invention, together with the associated line guiding rod 12, has normally already been mounted at a time in which no lines have yet been laid, and thus there are also not yet any cable ties 18 for securing the locking pin 15, the locking pin 15 adjoins a locking clip 19 on the other end, which is opposite the eye 17 (see FIG. 8), which may be clipped onto the cantilever section 5, as shown in FIGS. 1, 2, and 4 through 7. It is thus possible to insert the line guiding rod 12 into the reception pocket 15 already during the mounting of the holder 1 and fix it using the locking pin 14 without this falling out again immediately.

Figure 7:
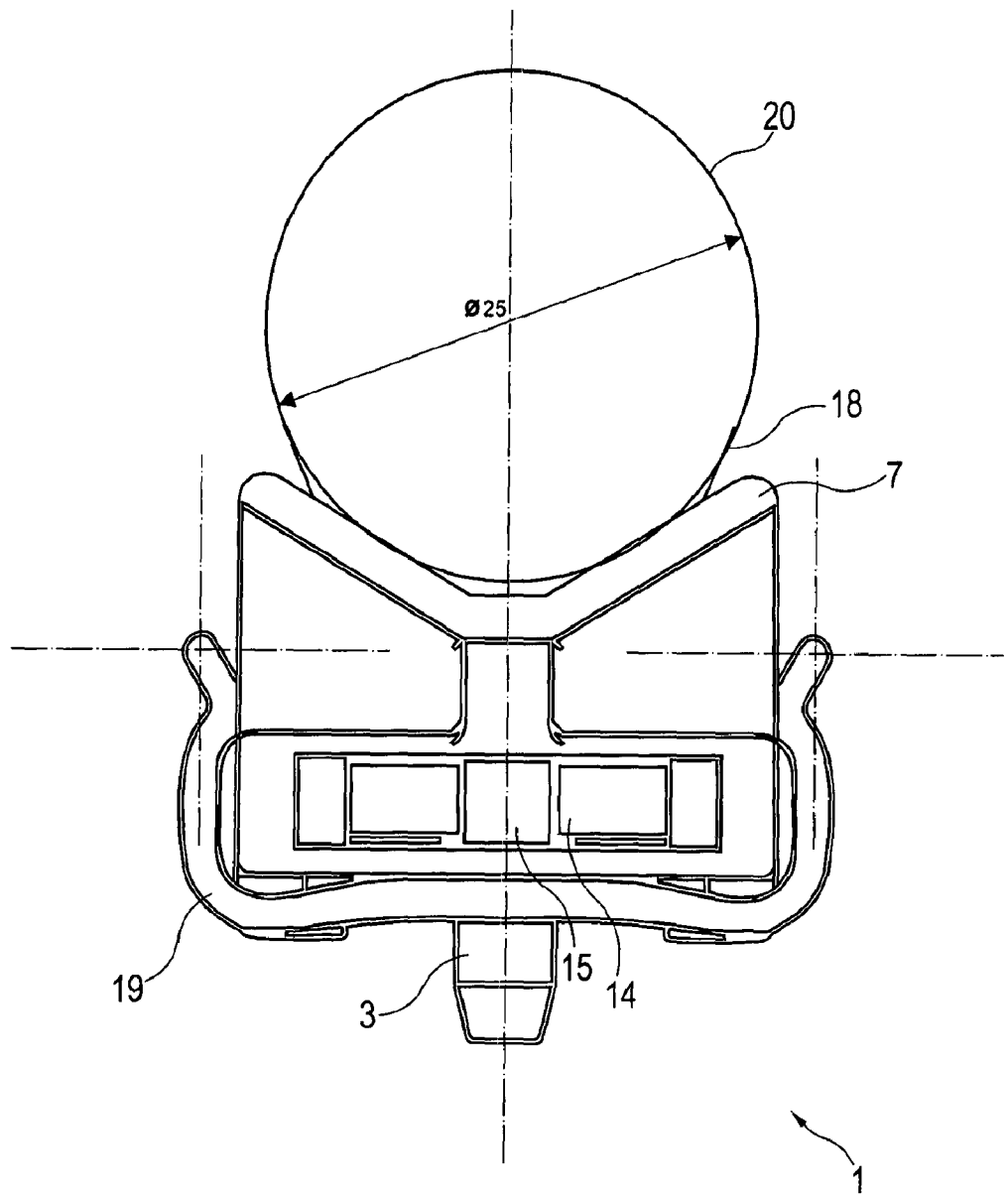
FIG. 7 shows a cross-section through the holder according to the present invention

FIG. 7 does show as an example how the holder 1 according to the present invention or the supports 7 receive a line 20 having a diameter of 25 mm, but the holder 1, because of the groove-shaped implementation of the holders or supports 7, is capable of receiving lines 20 implemented having different thicknesses. Thus, because of the groove shape of the supports 7, it is possible to receive lines having a diameter of approximately 5-25 mm securely using the holder 1.

Moreover, it is to be noted that "comprising" does not exclude other elements or steps and "a" or "an" does not exclude multiples. Furthermore, it is to be noted that features or steps which have been described with reference to one of the above exemplary embodiments may also be used in combination with other features or steps of other exemplary embodiments described above. Reference numerals in the claims are not to be seen as a restriction.

What is claimed is:

1. A holder for positioning a line on a structural component, comprising:
   a main body having a top side and a bottom side;
   a bracing element, which projects from the bottom side of the main body to press against a lateral face of the structural component and which divides the main body into a cantilever section and a support section; and
   an engagement element, which projects from the bottom side of the main body in the area of the support section and is adapted to be received frictionally locked by a reception opening in the structural component;
   wherein the cantilever section is adapted to project from the structural component, wherein the support section is adapted to be in contact with the structural component, and wherein on the top side of the main body in the area of the cantilever section at least one support for a line is formed, through whose weight load the holder experiences a torque, which is transferred via the bracing element and the engagement element as a force couple into the structural component along a direction substantially perpendicular to the direction of the weight load.

2. The holder of claim 1, wherein the engagement element has a shape expanding in a wedge from the support section, and wherein the holder (1) also comprises a separate counter wedge, using which the engagement element may be wedged frictionally locked in the reception opening.

3. The holder of claim 2, wherein the support section has a through opening, through which the counter wedge may be wedged against the wedge shape of the engagement element and, in addition, against the reception opening of the structural component.

4. The holder of claim 1, also comprising a reception unit, which is adapted to secure a line guiding rod.

5. The holder of claim 4, wherein the reception unit is formed below the at least one line support on a freely protruding end of the cantilever section as a reception pocket for receiving an end of the line guiding rod.

6. The holder of claim 5, wherein the reception pocket has a boundary wall having a hole, and the holder also comprises a locking pin, which is insertable through the hole into the reception pocket to secure the line guiding rod therein.

7. The holder of claim 6, wherein the locking pin is equipped on one end, which end comes to rest in the reception pocket, with an eye, through which a cable tie may be guided to fix a line laid on the support.

8. The holder of claim 7, wherein two aligned groove-shaped supports are formed on the top side of the main body in the area of the cantilever section, which are spaced from one another by an interval in such a way that the cable tie may be guided through them to fix a line laid on the two supports.

9. The holder of claim 7, wherein the locking pin adjoins in one piece at the other end to a locking clip, which is attached in a formfitting way to the cantilever section.

10. A line guiding system for reducing the sag of a guided line between two structural components, comprising:
   at least one holder comprising:
   a main body having a top side and a bottom side;
   a bracing element, which projects from the bottom side of the main body to press against a lateral face of the structural component and which divides the main body into a cantilever section and a support section; and
   an engagement element, which projects from the bottom side of the main body in the area of the support section and is adapted to be received frictionally locked by a reception opening in the structural component;
   wherein the cantilever section is adapted to project from the structural component, wherein the support section is adapted to be in contact with the structural component, and
   wherein on the top side of the main body in the area of the cantilever section at least one support for a line is formed, through whose weight load the holder experiences a torque, which is transferred via the bracing element and the engagement element as a force couple into the structural component along a direction substantially perpendicular to the direction of the weight load; and
   a line guiding rod, one end of which is received by the reception pocket of the holder, so that a line laid on the support of the holder is laid without sag along the line guiding rod.

11. The line guiding system of claim 10, wherein the line guiding rod is equipped at its end with a ear, which is penetrated by an eye, through which the locking pin extends.

12. An aircraft having at least one line, which is guided without sag between two structural components using a line guiding system, said line guiding system comprising:
   a main body having a top side and a bottom side;
   a bracing element, which projects from the bottom side of the main body to press against a lateral face of the structural component and which divides the main body into a cantilever section and a support section; and
   an engagement element, which projects from the bottom side of the main body in the area of the support section and is adapted to be received frictionally locked by a reception opening in the structural component;
   wherein the cantilever section is adapted to project from the structural component, wherein the support section is adapted to be in contact with the structural component, and
   wherein on the top side of the main body in the area of the cantilever section at least one support for a line is formed, through whose weight load the holder experiences a torque, which is transferred via the bracing element and the engagement element as a force couple into the structural component along a direction substantially perpendicular to the direction of the weight load; and
   a line guiding rod, one end of which is received by the reception pocket of the holder, so that a line laid on the support of the holder is laid without sag along the line guiding rod.

13. A use of a line guiding system of claim 10 to guide a line at least partially between two structural components without sag in an aircraft.

14. An aircraft having at least one line, which is guided without sag between two structural components using a line guiding system, said line guiding system comprising:
   a main body having a top side and a bottom side;
   a bracing element, which projects from the bottom side of the main body to press against a lateral face of the structural component and which divides the main body into a cantilever section and a support section; and
   an engagement element, which projects from the bottom side of the main body in the area of the support section and is adapted to be received frictionally locked by a reception opening in the structural component;

wherein the cantilever section is adapted to project from the structural component, wherein the support section is adapted to be in contact with the structural component, and wherein on the top side of the main body in the area of the cantilever section at least one support for a line is formed, through whose weight load the holder experiences a torque, which is transferred via the bracing element and the engagement element as a force couple into the structural component along a direction substantially perpendicular to the direction of the weight load; and a line guiding rod, one end of which is received by the reception pocket of the holder, so that a line laid on the support of the holder is laid without sag along the line guiding rod.

15. A use of a line guiding system of claim 11 to guide a line at least partially between two structural components without sag in an aircraft.

* * * * *